(No Model.)  2 Sheets—Sheet 1.

J. C. McCASKILL.
COMBINED COTTON CHOPPER AND SCRAPER.

No. 248,871.  Patented Nov. 1, 1881.

Witnesses:
A. M. Long.
A. M. Tanner.

Inventor.
John C. McCaskill
By Paine, Grafton & Laird
Attorneys.

(No Model.) 2 Sheets—Sheet 2.

J. C. McCASKILL.
COMBINED COTTON CHOPPER AND SCRAPER.

No. 248,871. Patented Nov. 1, 1881.

UNITED STATES PATENT OFFICE.

JOHN C. McCASKILL, OF CLINTON, TEXAS.

COMBINED COTTON CHOPPER AND SCRAPER.

SPECIFICATION forming part of Letters Patent No. 248,871, dated November 1, 1881.

Application filed July 29, 1881. (No model.)

*To all whom it may concern:*

Be it known that I, JOHN C. McCASKILL, a citizen of the United States, residing at Clinton, in the county of De Witt and State of Texas, have invented certain new and useful Improvements in Cotton Choppers and Scrapers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to that class of agricultural machines which are employed for scraping the ground at the sides of a row of cotton-plants and chopping out or thinning said plants, so as to leave the same standing at regular intervals apart.

The object of the invention is to provide a combined cotton scraper and chopper in which the component parts are so constructed and arranged that simplicity of construction combined with an easy and effective operation of the parts is attained.

The invention will first be fully described, and then set forth in the claims.

Figure 1:
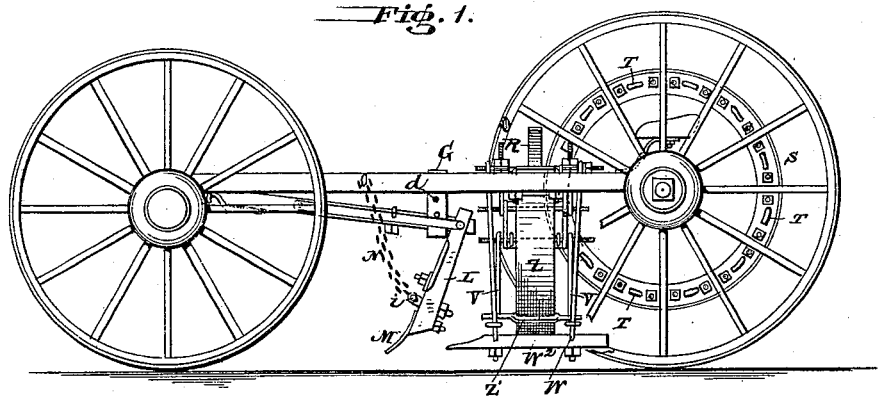
Figure 2:
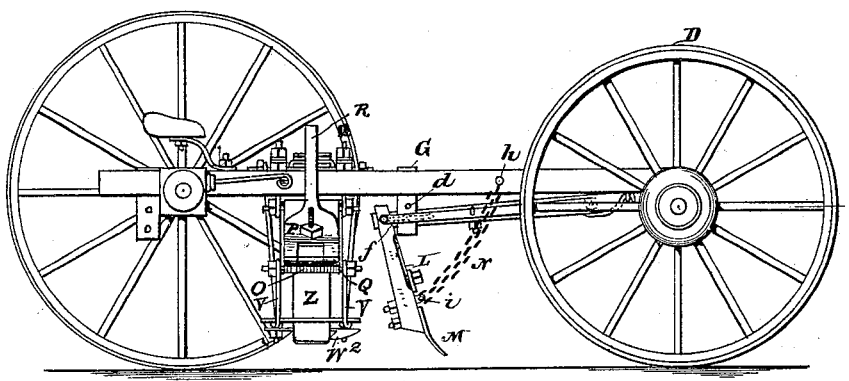
Figure 5:
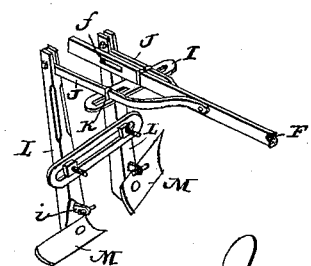
Figure 3:
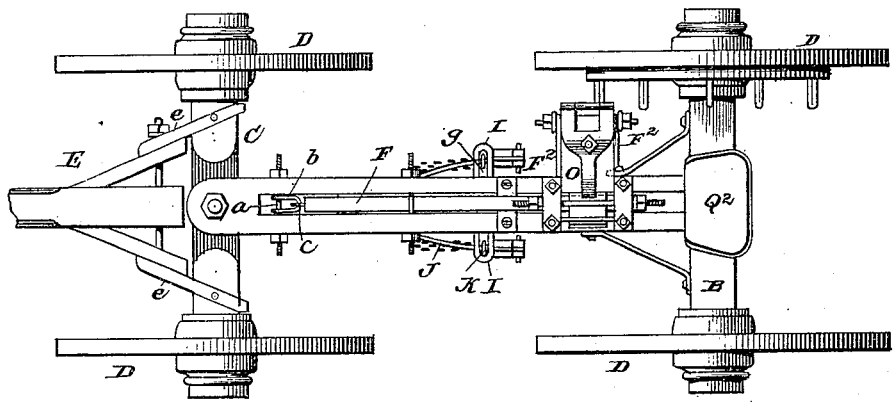
Figure 4:
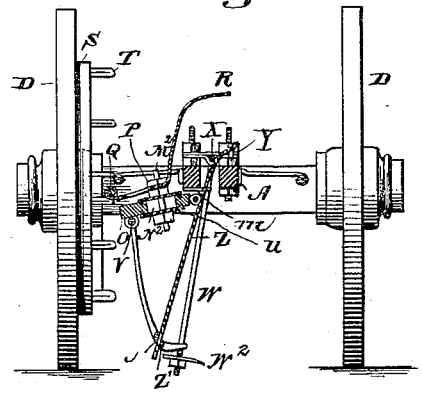

In the drawings, Figure 1 is a side elevation of a cotton scraper and chopper constructed according to my invention. Fig. 2 is another side elevation, showing the driving-wheel removed, and representing the devices for suspending and actuating the vibrating chopping-hoe. Fig. 3 is a plan or top view of the machine. Fig. 4 is a cross-section thereof, and Fig. 5 is a detail.

The frame of my combined scraper and chopper comprises a pair of longitudinal beams, A, which are mortised or secured to a rear axle, B, and connected with a front axle, C, by a suitable pivot-bolt. Both axles carry suitable ground or traction wheels, D, which run at the sides of the row of standing plants. A draft-tongue, E, is pivoted to suitable hounds, $e$, extending from the front axle. The beams A of the frame are arranged so as to leave an open space between the same for the reception or suspension of the operative parts hereinafter mentioned. Near the front end of the beams A, which may also be termed a "coupling" or "reach," is located a transverse rod or bolt, $a$, having a screw-threaded end and nut for retaining it in place. An ordinary U-shaped clevis or hanger, $b$, fitted on said rod or bolt $a$, extends in a downward direction between the beams A, and serves as a support or point of attachment for the beam F, carrying the scraping devices. A hook, $c$, on the front end of said beam serves to form the connection with the clevis or hanger $b$, the latter being free to vibrate or swing in a longitudinal direction to a limited degree. The rear end of the beam F rests in a yoke or hanger, G, which is secured to the beams or reach A by suitable ears or flanges, and has two or more holes, $d$, for the reception of a transverse pin or bolt passing through a slot, $f$, made in the beam F. The holes $d$ will permit the aforesaid pin to be shifted therein, so as to provide for the vertical adjustment of the beam F, and the slot in the latter will permit it to receive a limited longitudinal movement.

An arm or plate, I, bolted or clipped to the beam F, extends at right angles to the latter, on both sides thereof, and serves as a point of attachment for two longitudinal bars, J. These bars are firmly bolted to the beam F at their front ends, and hooked bolts K, passing through slots $g$ in the plate I, serve to clamp the bars J to the latter. The hooks of these bolts fit over the bars J, and their threaded lower ends have nuts, which, when tightened, will serve to firmly hold the bars J to the plate I. It will be evident that by loosening said nuts the bars J can be adjusted laterally the distance of the slots in the plate I.

Standards or stocks L, jointed at their upper ends to the rear extremities of the bars J, carry suitable scraper-blades or plows, M. These standards L are also connected with the frame of the machine, or with the beams A, by means of chains N and a cross rod or pin, $h$, passing through or projecting from said beams.

The chains can be readily shifted, or the pin $h$ placed in different links thereof, so as to provide for the angular adjustment of the scrapers. The chains are preferably connected with lugs or ears $i$ projecting from the scraper-standards by means of wooden pins, so that when an obstruction is encountered by the scraper-blades the pins will break and permit the standards to swing in a rearward direction.

The chopping mechanism, located immediately in rear of the scraping devices, is constructed as follows, viz.: A board or treadle, O, capable of oscillating in a vertical direction, is pivoted or hinged to the under side of one of the beams A. This board or treadle carries on its top an adjustable plate, P, having a roller, Q, at its outer end, and an upwardly and inwardly extending arm or handle, R, at its inner end. A ring or collar, S, bolted or otherwise secured to one of the rear traction-wheels, is provided with tappets or projections T, which are located at such intervals apart as may be required by the work to be performed or the distance the plants are to be left standing apart from each other. A bolt or rod, U, secured to the under side of the oscillating board or treadle O, at the free or outer end thereof, passes through eyes on the upper ends of a pair of vertical rods, V, and a pair of rods or hoe-handles, W, pass through eyes at the lower ends of said rods V. The rods or handles W are at their upper ends hung on a longitudinal rod or shaft, X, which is fitted in bearing-plates Y, secured to the beams A, so that said shaft can properly rock in its bearings as the hoe is vibrated.

A vertical plate-spring, Z, is secured to the top of one of the beams A by a hook and staple or other fastening, and it extends through a slotted plate, $m$, on the under side of the other beam A, and its lower or free end passes through a slotted cross or connecting piece, Z', of the rods V. A flat or horizontal hoe-blade, W², is perforated for the passage of the rods or handles W, and nuts on the lower ends of said rods serve to hold the hoe thereon. Rods or braces F², running along the front and rear edges of the treadle or board O, have eyes or loops at their ends, which are fitted on the rods or bolts, extending transversely across said treadle or board. By these means a frame is formed for the latter, and it may be stated that the rods F² generally turn on the rod which is secured to the beam at the inner end of the treadle O.

The plate P, fitted on the top of the treadle, is free to rotate or turn with a bolt, M², passing through a slot, N², made in the treadle or board O. In this manner it will be observed the free end of the plate P can be turned from the driver's seat Q², so as to disengage it from the tappet-ring on the traction-wheel. By loosening the nuts on the bolt M² the same can be shifted in the slot of the board or treadle O, so as to diminish or increase the length of the stroke of the hoe by changing the position of the plate P in regard to the tappets.

Small plates or washers $u$, having prongs or spurs at their corners, are fitted to the treadle or board O above and below the slot therein. The bolt M² passes through these plates or washers, and their object is to hold the plate carrying the roller firmly in place.

The operation of the chopping devices may be briefly described as follows, viz: The rotation of the ground-wheel will cause the tappets to successively strike the roller of the plate, and every time a tappet engages said roller the treadle or board O is depressed, so as to cause the hoe carried thereby to make its cutting-stroke and chop out a number of plants corresponding to the length of the hoe. After the downward pressure of the tappet is discontinued the vertical plate-spring quickly returns the hoe to its normal position for the next stroke. The hoe is firmly held to its work or prevented from sliding on its rods or handles by means of the rods carried by the treadle or board O. It is manifest that when the latter is depressed said rods will slide down upon the hoe-rods and bear upon the hoe-blades while the same is making its cutting-stroke.

I am aware that adjustable cotton-scrapers are not broadly new, and that a vibrating hoe operating transversely to the line of progress of the machine has heretofore been used in a cotton-chopper.

I also disclaim the broad idea of operating a chopping-hoe by means of a tappet-wheel on a traction-wheel and a spring for returning said hoe to its normal position after each performance of the cutting operation.

Having thus described my invention, what I claim as new, and desire to secure by Letters Patent, is—

1. In a combined cotton scraper and chopper, the combination of a central beam having a slot at its rear end and a hook at its front end, the laterally-adjustable bars connected with said beam, the scraper-standards pivoted to the adjustable bars, the front clevis for the beam, and rear yoke or support having a transverse pin, and the suspension-chains with a supporting-frame, as and for the purpose set forth.

2. In a cotton-chopper, the combination of the pivoted treadle or board having an adjustable top plate and downwardly-extending arms or rods, the hoe-handles passing through said arms or rods, and the vertical spring connected with the rods of the pivoted treadle, with the main frame and tappet-wheel, or its equivalent, on a traction or ground wheel, as and for the purpose set forth.

3. The combination of the adjustable plate having an outer roller and inner arm, the bolt connected with said plate, and the oscillating slotted treadle, with the tappet or actuating wheel and the main frame, as and for the purpose set forth.

In testimony whereof I affix my signature in presence of two witnesses.

J. C. McCASKILL.

Witnesses:
C. C. HOUNTON,
H. E. CRISWELL.